United States Patent [19]

Abbott

[11] Patent Number: 5,727,642

[45] Date of Patent: Mar. 17, 1998

[54] GOLF CART

[76] Inventor: Emerson L. Abbott, 10607 Heller Rd., Grand Rapids, Ohio 43522

[21] Appl. No.: 590,474

[22] Filed: Jan. 23, 1996

[51] Int. Cl.[6] .............. B60K 1/00; A61G 5/04; B60R 9/00
[52] U.S. Cl. .......... 180/65.1; 180/6.5; 180/907; 280/DIG. 5; 280/304.1; 224/274
[58] Field of Search .............. 180/65.1, 65.5, 180/65.6, 65.7, 907, 908; 280/DIG. 5, 760, 762, 769, 288.4, 304.1; 224/274, 509, 513, 517, 511, 526

[56] References Cited

U.S. PATENT DOCUMENTS

| 2,973,048 | 2/1961 | Jensen | 180/27 |
|---|---|---|---|
| 4,298,151 | 11/1981 | O'Conner | 224/329 |
| 4,355,746 | 10/1982 | Casady | 224/274 |
| 4,522,420 | 6/1985 | Hannappel | 280/289 |
| 4,533,013 | 8/1985 | Hightower | 180/210 |
| 4,570,739 | 2/1986 | Kramer | 180/216 |
| 4,989,767 | 2/1991 | Buschbom | 224/274 |
| 5,038,983 | 8/1991 | Tomososki | 224/42.43 |
| 5,069,481 | 12/1991 | Strange | 280/769 |
| 5,123,531 | 6/1992 | Beretta | 206/315.3 |
| 5,150,762 | 9/1992 | Stegeman et al. | |
| 5,238,082 | 8/1993 | Stegeman et al. | |
| 5,346,028 | 9/1994 | Cassano | 180/19.2 |
| 5,363,934 | 11/1994 | Edmund et al. | 180/6.5 |
| 5,439,151 | 8/1995 | Clayton | 224/509 |
| 5,620,126 | 4/1997 | Janek | 224/527 |

FOREIGN PATENT DOCUMENTS

| 602300 A1 | 6/1994 | Italy | 280/DIG. 5 |

*Primary Examiner*—Brian L. Johnson
*Assistant Examiner*—Bridget Avery
*Attorney, Agent, or Firm*—Donald R. Fraser

[57] ABSTRACT

A golf cart for persons who are obliged to traverse a golf course in a cart which includes a golf bag carrier mechanism, steering assembly, and an adjustable seat to enable the person to swing a golf club without interference with the aforementioned components. The seat may be rotated in either direction from the traversing axis of the cart to enable the person to face the golf ball to be struck. The steering mechanism and the golf bag carrier are capable of being moved to a position free from the swing pattern of the seated person.

3 Claims, 3 Drawing Sheets

GOLF CART

BACKGROUND OF THE INVENTION

1. Field of the Invention

The present invention relates to carts for transporting persons over golf courses and more particularly designed for those persons who for one reason or another cannot walk or stand sufficiently to properly participate in playing the game of golf.

More specifically, the invention relates to a golf cart for the handicapped wherein the golf bag carrier and the steering mechanism are designed to be moved to a position which completely eliminates any obstruction in the swinging pattern of the golf club of the person seated on the cart.

2. Prior Art

The prior art is replete with vehicular mechanism useful for transporting handicapped persons. These vehicles are designed to facilitate ingress and egress, but do not address the problem faced by the non-ambulatory person who is desirous of playing golf.

SUMMARY OF THE INVENTION

It is an object of the present invention to produce a golf cart which will meet the requirements of the Americans With Disabilities Act (ADA 1990) which dictates that golf courses open to the public must provide suitable transportation for the handicapped who are desirous of playing golf.

It is another object of the invention to produce a golf cart capable of transporting at least one person provided with a golf bag holder selectively positionable in respect of the cart.

Another object of the invention is to produce a golf cart wherein the steering mechanism and the golf bag carrying support may be moved from an operative position to a secondary position enabling the operator to swing a golf club through the entire arc of the swing without obstruction.

Still another object of the invention is to produce a specialized golf cart which can be driven on greens and tee boxes with minimal damage to the turf.

Another object of the invention is to produce a golf cart provided with supporting seat rotation which permits a person, paralyzed from the waist down, to play golf from the cart.

Further objects and advantages of this invention will be apparent from the following description and appended claims, reference being made to the accompanying drawings forming a part of the specification, wherein like reference characters designate corresponding parts in the several views.

DESCRIPTION OF THE PREFERRED EMBODIMENTS

Figure 1:
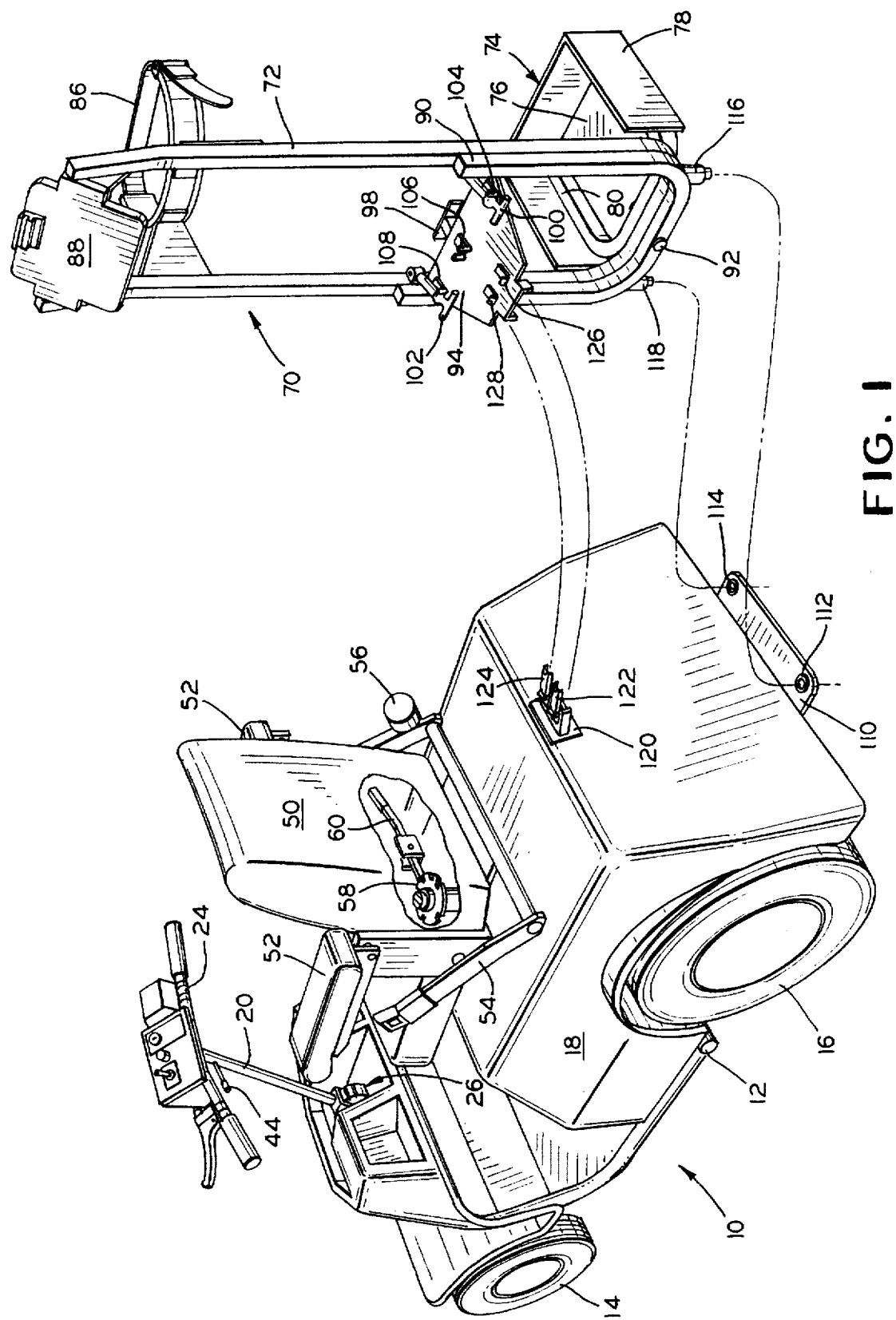
FIG. 1 is a perspective exploded view of a golf cart incorporating the features of the present invention.

Referring to the drawings, and in particular FIG. 1, there is illustrated a golf cart 10 which includes a frame 12, only partially illustrated, having a plurality of ground engaging front wheels 14 and rear wheels 16 suitably attached to the frame 12. A body 18 is superposed over the frame 12. The body 18 is typically formed of a fiberglass reinforced resin, for example. The body 18 may be formed in a single molded part or may be formed of a plurality of interrelated body components.

Also, while mention is made of a separate frame and body, it will be understood that satisfactory results could readily be achieved by fabricating a monocoque structure wherein no separate frame is required and the body portion is attached directly to and suspended by the wheel assemblies. Such structures are well known in the automotive field.

In the illustrated embodiment, the front wheels 14 are employed to steer the golf cart through conventional cart steering linkage mechanism (not shown) coupled to a collapsible steering column. The upper portion 20 of the steering column is further provided with a handle bar assembly 24 which used to impart rotational movement to the steering column and thence to the steering wheels 14. Also, the handle bar assembly 24 supports such accoutrements as brake controls, ignition switch, light switch, and speed control, for example.

Figure 4:
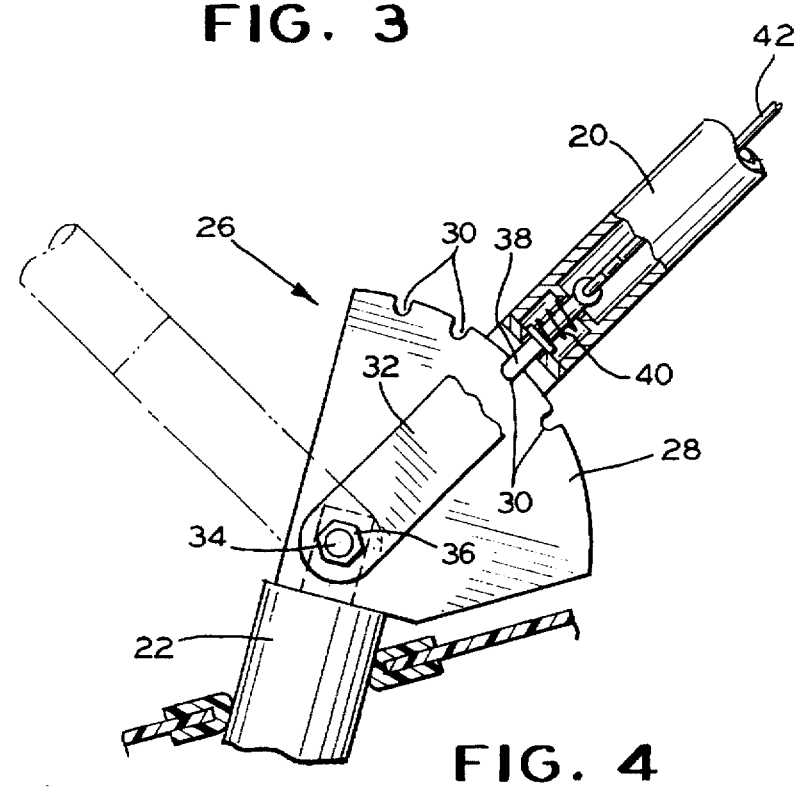
FIG. 4 is an enlarged fragmentary view partially in section illustrating the collapsible steering mechanism of the golf cart illustrated in FIG. 1.

The steering column is provided with mechanism, generally indicated by reference numeral 26 as manufactured by Ranger All Season Corporation of George, Iowa to enable the upper portion 20 of the steering column and the associated handle bar assembly to be pivoted relative to the lower portion 22. Mechanism of the general type is illustrated and described in U.S. Pat. No. 5,238,082 to Stegeman et al. Typically, the mechanism 26 is illustrated in FIG. 4 and includes a generally quadrant shaped member 28 integrally affixed to the upper terminal end of the lower portion 22 of the steering column. The member 28 is provided with an arcuately formed upper edge surface having a plurality of spaced apart notches 30.

The lower end of the upper portion 20 of the steering column terminates in a downwardly depending generally U-shaped yoke 32 pivotally connected to the upper end of the lower portion 22 of the steering column by a journal member 34 and an associated threaded fastener 36.

The inclination of the upper portion 20 relative to the lower portion 22 is effected through a plunger 38 which is normally biased downwardly by a helical spring 40. Normally, the spring 40 biases the plunger 38 into engagement with a selected one of the spaced apart notches 30. When it is desired to change the inclination of the upper portion 20, an upwardly extending rod or cable 42 coupled to the plunger 38, is caused to be pulled upwardly unseating the plunger 38 from the one of the notches 30. Then the upper portion 20 is pivoted to the desired position and the plunger 38 is allowed to return to its normal positions by the spring 40 causing the plunger 38 to once again seat in a notch 30. Movement of the cable or rod 42 is effected, for example, by connection with the pivotally mounted lever 44. Should a more complete collapse of the steering column be desired to the position shown in phantom lines in FIG. 4, for example, the plunger 38 is pulled upwardly against the bias of the spring 40 and the upper portion 20 is moved completely free of the notched plate 28.

The rear wheels 16 are typically driven by a battery powered electric motor typically housed within the body 18. The wheels 16 are typically driven by an electric motor coupled thereto through a suitable gear train and differential gearing. Suitable access means is provided in the body 18 to facilitate the servicing of the motor and associated driving mechanism.

An occupant's seat 50 is mounted on the body 18 and is provided adjustable arm rests 52 and a seat belt 54 of the type having a housing 56 for retrieving and storing the seat belt webbing when not in use. The seat 50 is mounted to the body 18 by a conventional swivel mounting 58 by the type manufactured by Ranger All Season Corporation of George, Iowa. A lever 60 is provided to unlatch and latch the seat 50 to enable the seat 50 to be rotated typically through 360°.

A golf bag carrier assembly 70 is detachably mounted adjacent the rear of the body 18. The carrier 70 includes an upstanding U-shaped member 72 having an outwardly extending base 74. The base 74 includes a bottom panel 76, upstanding side walls 78, and a horizontally disposed U-shaped member 80.

The base 74 is attached to the U-shaped member 72 by a pair of threaded fasteners 82 and 84.

At the upper portion of the member 72 is a golf bag attaching assembly including an adjustable belt 86 which extends rearwardly and in general alignment with the base 74.

On the opposite side of the member 72 is a score and holding device 88 cable of holding a score card facing the occupant of the cart.

A second U-shaped member 90 is pivotally affixed to the U-shaped member 72 by a pivot pin 92.

Figure 2:
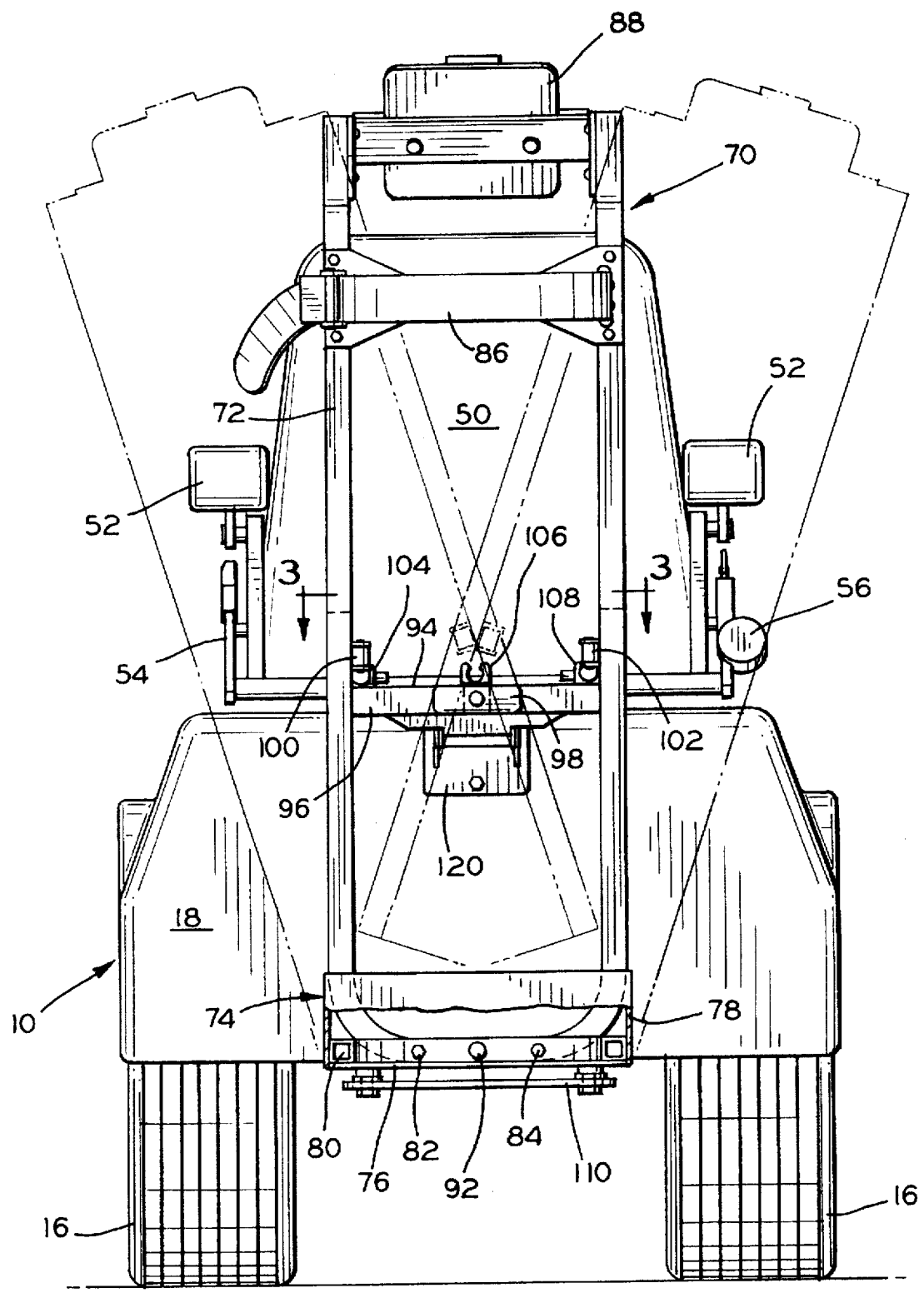
FIG. 2 is a rear view of the golf cart illustrated in FIG. 1.

In order to latch the U-shaped members 72 and 90 in the fixed relative position illustrated in full lines on the drawings and to provide for left or right positions, as illustrated in phantom in FIG. 2, there is provided a plate 94. The plate 94 is welded or otherwise fixedly secured to the upper portions of the spaced apart legs of the U-shaped member 90. The plate 94 is disposed to extend forwardly of the U-shaped member 90. Also, the plate 94 is provided with a downwardly turned rearward edge 96 for supporting an outwardly extending generally H-shaped bracket 98. The bracket 98 is adapted to effectively limit the pivotal movement of the U-shaped member 72 by receiving a respective leg of the member 72 during left or with pivotal movement thereof.

Figure 3:
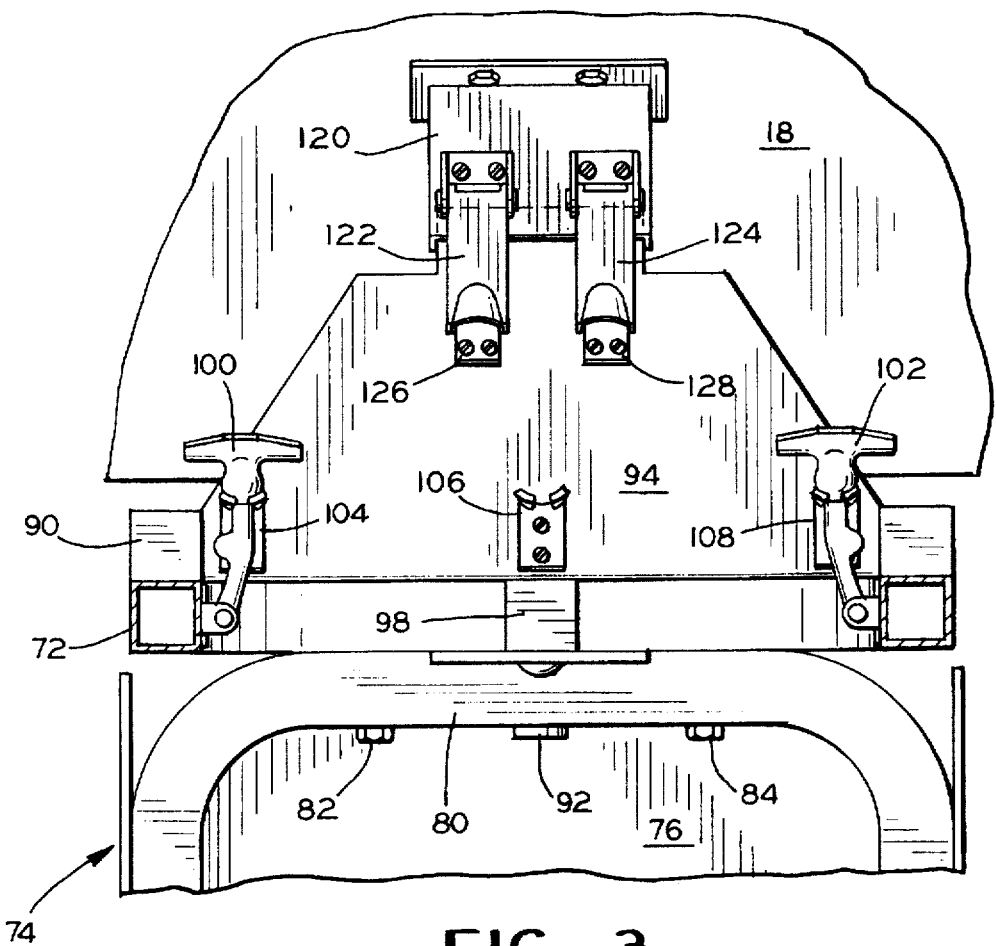
FIG. 3 is a fragmentary sectional view taken along line 3—3 of FIG. 2.

Further, T-handle rubber latches 100 and 102 are pivotally connected to respective legs of the U-shaped member 72. The latches 100 and 102 cooperate with keeper brackets 104, 106, 108 suitably mounted on and secured to spaced relation on the upper surface of the rear edge of the plate 94. FIGS. 1, 2, and 3 show the normal relative position of the U-shaped members 72 and 90 wherein the T-handle rubber latches 100 and 102 are connected in the paper brackets 104 and 108, respectively. It will be understood that the use of such latching mechanism provides vibration and sound dampening and compensation for misalignment between the latching components. Opening or releasing of the latching mechanisms is easily achieved by simply pulling the T-handles 100, 102 and sliding the bulbous portions thereof out of the keeper brackets 104, 108, respectively. Latching is effected by a reversal of the above procedure.

The U-shaped member 72 may be latched in a left or right pivot position by coupling the T-shaped handle 100, 102, respectively, in the centermost keeper bracket 106.

The entire golf bag carrier assembly 70 is detachably secured to the main cart 10. A base plate 110, having spaced apart apertures 112 and 114, is suitably secured to cart 10 and extends rearwardly therefrom.

The plate 110 is adapted to support the lower portion of the carrier assembly 70 by the receipt of a pair of leg members 116 and 118 which depend downwardly from the U-shaped member 90. The leg members 116 and 118 are aligned with and received by the apertures 112 and 114. A cooperating latching bracket assembly 120 is mounted to the body 18 in spaced relation above the base plate 110. The latching bracket assembly 120 includes latching means 122, 124 which cooperate with keeper hooks 126 and 128, respectively, mounted on the plate 94. The latching means 122, 124 of the drawhook toggle-type may be used satisfactorily.

Satisfactory results have been obtained through the use of tension latches for the latching means 122 and 124 of the type manufactured and sold by Camloc Products Group, Fairchild Fasteners Group, Fairchild Corporation, of Hasbrook Heights, N.J. 07604 and identified as medium duty tension latches 5/L Series.

It will be understood by the aforedescribed description and the accompanying drawing that a motorized golf cart has been described which is provided with a 360° seat rotation and an associated seat belt which enables a person, paralyzed, for example, from the waist down, to play golf without moving from the cart. Rotation of the golf bag carrier 70 will permit the forward swing of the golf club. Positioning the steering column in a collapsed position enables the backswing of the golf club.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A golf cart comprising:
   a) a main frame;
   b) ground engaging wheels attached to said main frame;
   c) motor means mounted on said main frame and drivingly interconnected to drive at least one of said ground engaging wheels;
   d) steering means connected to at least one of said ground engaging wheels to effect steering movement thereof;
   e) a seat for supporting an invalid golfer, said seat mounted for selective rotational movement about a vertical axis, said seat adapted to be selectively positionable in a driving position, a position ninety degrees displaced from the driving position either clockwise or counterclockwise;
   f) a golf bag carrier including a frame member having golf bag retaining means affixed thereto;
   g) means for pivotally mounting the frame member of said carrier to said main frame, said means including a pivotal connection permitting pivotal movement of said carrier from a first transporting position to a second position permitting the golf bag to be pivoted to a position to allow an invalid golfer to an unencumbered golf swing when said seat is in said displaced position; and
   h) latch means selectively locking the frame member of said carrier in the first position and the second position.

2. A golf cart as defined in claim 1 including a plate affixed to and extending rearwardly of said main frame, said plate having spaced apart apertures; and leg members depending from said means for pivotally mounting the frame member of said carrier, said leg members receivable within the apertures of said plate.

3. A golf cart as defined in claim 1 wherein said latch means include elastically biased hook means.

* * * * *